United States Patent
Maluf

(10) Patent No.: US 8,359,068 B1
(45) Date of Patent: Jan. 22, 2013

(54) CELLPHONE VIDEO IMAGING

(75) Inventor: David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 767 days.

(21) Appl. No.: 12/215,611

(22) Filed: Jun. 27, 2008

(51) Int. Cl.
*H04M 1/00* (2006.01)

(52) U.S. Cl. ............... 455/556.1; 348/14.02; 348/14.03; 379/433.01; 379/433.13; 379/434; 455/575.1; 455/90.1; 455/90.2; 455/90.3

(58) Field of Classification Search .... 348/14.01–14.16; 455/575.1–575.9, 90.1–90.3, 550.1–560, 455/575.1–90.3; 370/259–271, 351–356; 709/201–207, 217–248
See application file for complete search history.

(56) References Cited

U.S. PATENT DOCUMENTS

| | | | |
|---|---|---|---|
| 5,806,005 A * | 9/1998 | Hull et al. ...................... | 455/566 |
| 6,424,843 B1 * | 7/2002 | Reitmaa et al. ............... | 455/566 |
| 7,366,541 B2 * | 4/2008 | Goebel et al. ................. | 455/557 |
| 7,375,759 B2 * | 5/2008 | Lin ............................... | 348/371 |
| 7,512,416 B2 * | 3/2009 | Arell et al. .................... | 455/557 |
| 8,120,640 B2 * | 2/2012 | Mikami ..................... | 348/14.16 |
| 2002/0089589 A1 * | 7/2002 | Adair et al. .................... | 348/158 |
| 2003/0181225 A1 * | 9/2003 | Hasegawa et al. ............. | 455/566 |
| 2005/0094020 A1 * | 5/2005 | Matsumoto et al. .......... | 348/337 |
| 2008/0122796 A1 * | 5/2008 | Jobs et al. ..................... | 345/173 |
| 2008/0171571 A1 * | 7/2008 | Feil et al. .................. | 455/556.1 |
| 2008/0250459 A1 * | 10/2008 | Roman .......................... | 725/62 |

* cited by examiner

*Primary Examiner* — Hemant Patel
(74) *Attorney, Agent, or Firm* — Patent Capital Group

(57) ABSTRACT

A system for forming and transmitting a plurality of video images, at an image transmission rate of at least 1-3 images per sec, from a first cellphone to a second cellphone spaced apart from the first cellphone. A first cellphone user can choose to illuminate and transmit an image of the user or an image of a selected object distinct from the user.

9 Claims, 3 Drawing Sheets

CELLPHONE VIDEO IMAGING

FIELD OF THE INVENTION

This invention relates to enhancements of cellphone use.

BACKGROUND OF THE INVENTION

Cellphones are used increasingly as a substitute for landline phones and can be used, for example, in a telephone conference. In a telephone conference using only landlines, it is possible to supplement the telephone communications with a video image of one or more or all of the conference participants so that a first participant receives an image of a second participant as the conference proceeds. This video supplement can be used for identification or authentication and can be used to transmit and receive visual aid images of objects and/or documents discussed in the conference. However, this video supplement is not presently available where one or more of the participants uses a cellphone to communicate.

Communication of video images has become available through the AT&T Video Share, which is implemented in and around about 160 cities in 42 of the United States plus District of Columbia and Puerto Rico, where 3G coverage is available. AT&T Video Share is implemented on several high end cell phones, including SamSungA737, Samsung A727, Samsung A717, Samsung A707, Samsung Blackjack II, LGCUS15, LG Shine, LG Trax, and LG VU What is needed is a system for providing a video supplement for a (first) cellphone participant in a conference call with one or more other participants, where the supplement provides a video image of the first participant with a frame refresh rate of about 1-20 per second, depending on available bandwidth. Preferably, the video image should supply its own light source to illuminate and transmit relevant features of the first participant image, and optionally should allow at least one other participant to receive the first participant video image and other images provided by the first participant, for authentication purposes.

SUMMARY OF THE INVENTION

The invention meets these needs, by providing, in a first embodiment, a first cellphone with an integrated image forming mechanism and image transmission mechanism and with a lens, located on a first surface of the first cellphone, to receive and form an image viewed from a first direction and to transmit a representative of the formed image to at least a second cellphone that is spaced apart from the first cellphone. The first cellphone has a second surface, spaced apart from the first surface, that has at least one data entry key located thereon for use by a first cellphone user who is communicating with the second cellphone. The cellphone includes an image retroreflector, positioned on the first surface in association with the lens, that receives a user image of at least part of the first cellphone user and redirects the user image to the lens, when the retroreflector is in a first position. The retroreflector has a second position position in which an image of a selected object, other than the first cellphone user image, is received by the lens.

In a second embodiment, the invention provides a first cellphone with: an integrated image forming mechanism and image transmission mechanism; a flexible, rotatable visual image-transmission medium, such as an assembly of optical fibers; a lens at one end of the transmission medium, where the transmission medium and lens can be twisted or rotated to form and transmit an image of the cellphone user in a first rotated position (looking rearward) and to form and transmit an image of one or more object that can be seen or perceived by the user in a second rotated position (looking forward). The image thus formed is transmitted to a second cellphone that is spaced apart from the first cellphone. The first cellphone has at least one data entry key on one surface thereof.

In either embodiment, images of the first cellphone user and/or of the selected object can be formed and transmitted at a frame refresh rate of about 1-20 per second so that the cellphone system provides "slow video" imaging. The system can be used to supplement a teleconference between two or more users with visual aids, such as graphs and pages from documents (second position). The system can also be used to visually authenticate the identity of each user (first position) who transmits images of himself/herself using the cellphone video imaging system.

DESCRIPTION OF BEST MODE OF THE INVENTION

Figure 1A:
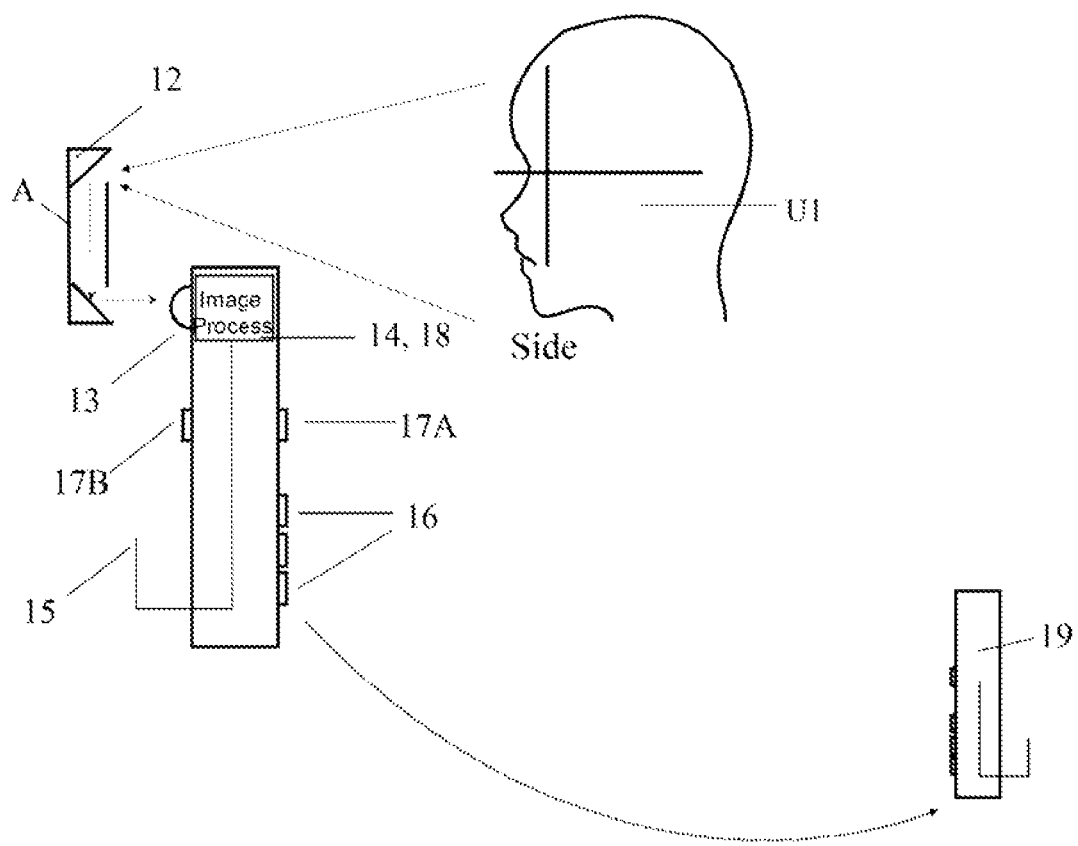
FIGS. 1A and 1B schematically illustrate use of a cellphone, equipped with a first embodiment of the invention, to illuminate a cellphone user and another object, respectively.
Figure 1B:
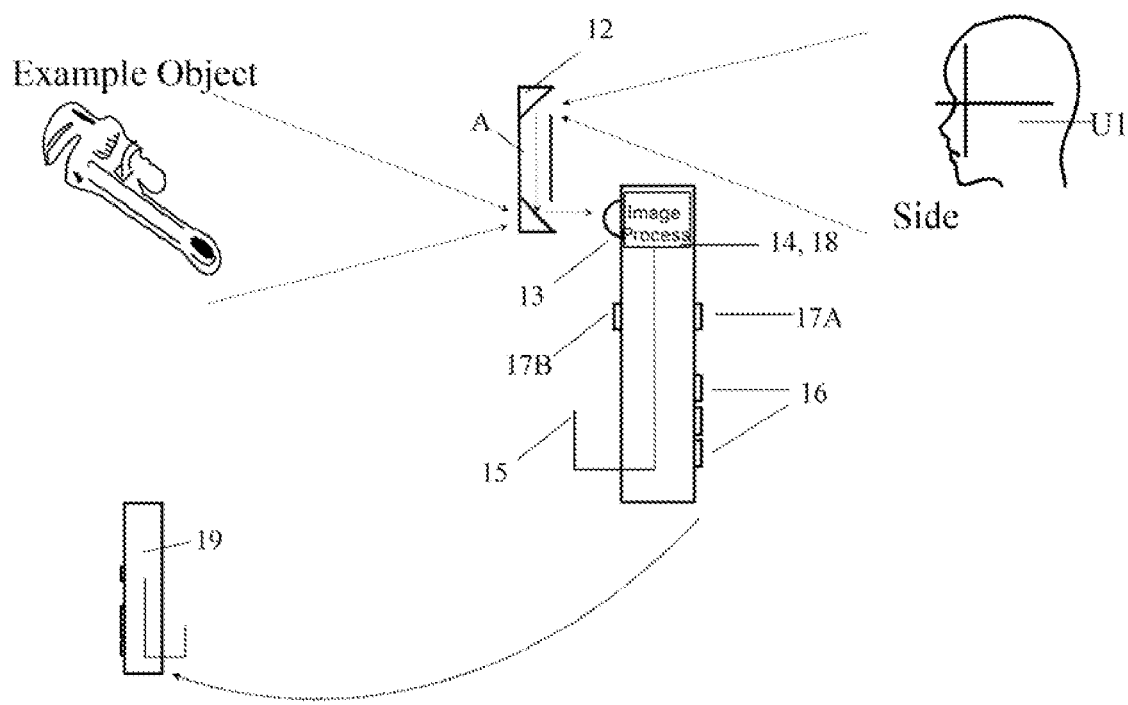

FIGS. 1A and 1B schematically illustrate use of a cellphone 11 configured according to an embodiment of the invention. In FIG. 1A, an image retroreflector 12 is configured in a first position, to receive and retroreflect an image of a user U1 of the cellphone through a lens 13 to an electronic/optical image processing module 14. An output signal from the image processing module 14 is received by an antenna 15, together with a signal from a keyboard and audio/voice input module 16, and is transmitted to a second cellphone 19 that is spaced apart from the first cellphone 11. With the retroreflector 12 configured in the first position, the lens 13 and image processing module 14 receive a facial image of the user U1, and possibly of one or more other objects located adjacent to the user U1 on a first side of the cellphone.

The first cellphone 11 optionally includes a first light source 17A and a second light source 17B. The first light source 17A is activated when the retroreflector 12 is configured in the first position, and the second light source 17B is activated when the retroreflector is configured in a second position. The light source 17A is activated when the retroreflector 12 is configured in the first position, and the light source 17B is activated when the retroreflector 12 is configured in the second position. The light source 17A or 17B is independently activatable, or is activated (only) when the ambient light intensity is below a threshold value, for illumination of the user U1 or of the object Obj. Optionally, the first and second light sources, 17A and 17B can be combined.

In FIGS. 1B, the retroreflector 12 is configured in a second position, where an aperture A in the retroreflector is positioned over the lens 13. With the retroreflector 12 configured in this second position, the lens 13 receives an image, through the aperture A, of one or more objects (e.g., one or more pages of a document) that is located adjacent to a second side of the first cellphone 11. The object image received by the lens 13 is again received and processed by the image processing module 14; and an image processing output signal (from 14) and/or a keyboard signal and audio/voice signal (from 16) are transmitted by the antenna 15 to the second cellphone 19.

With the retroreflector 12 in the first position, the first cellphone 11 transmits keyboard signals, audio/voice signals and/or an image of the first cellphone user U1 to the second cellphone 19. With the retroreflector 12 in the second position, the first cellphone 11 transmits keyboard signals, audio/voice signals and/or a selected image of the object Obj to the second cellphone 19. The object Obj may be a graph, a photograph or other optical image, or a page from a document, to provide a visual supplement to the keyboard signals and audio/voice signals transmitted by the first cellphone user U1. Preferably, the first cellphone 11 can form and transmit optical images to the second cellphone 19 at a rate of at least 1-20 images per second so that these optical images become a (slow) video supplement for the normal audio/voice signal transmitted by the first cellphone.

The received image from either the first retroreflector position or the second retroreflector position is optionally passed through an optical filter 18, before transmission of the image to the second cellphone 19, where the optical filter is preferably part of the processing module 14. The optical filter 18 may implement one or more of the following: (1) reduce the image contrast (e.g., where the image of the user U1 is to be transmitted); (2) increase the contrast of a document page that is to be transmitted; and (3) render as opaque a selected portion of a page of the document being imaged, by use of a strong color background for that portion of the page and use of a complementary color filter (useful where selected portions of a document are to be redacted). Alternatively, an optical filter is optionally installed on an image processing module on the second cellphone 19.

Figure 2:
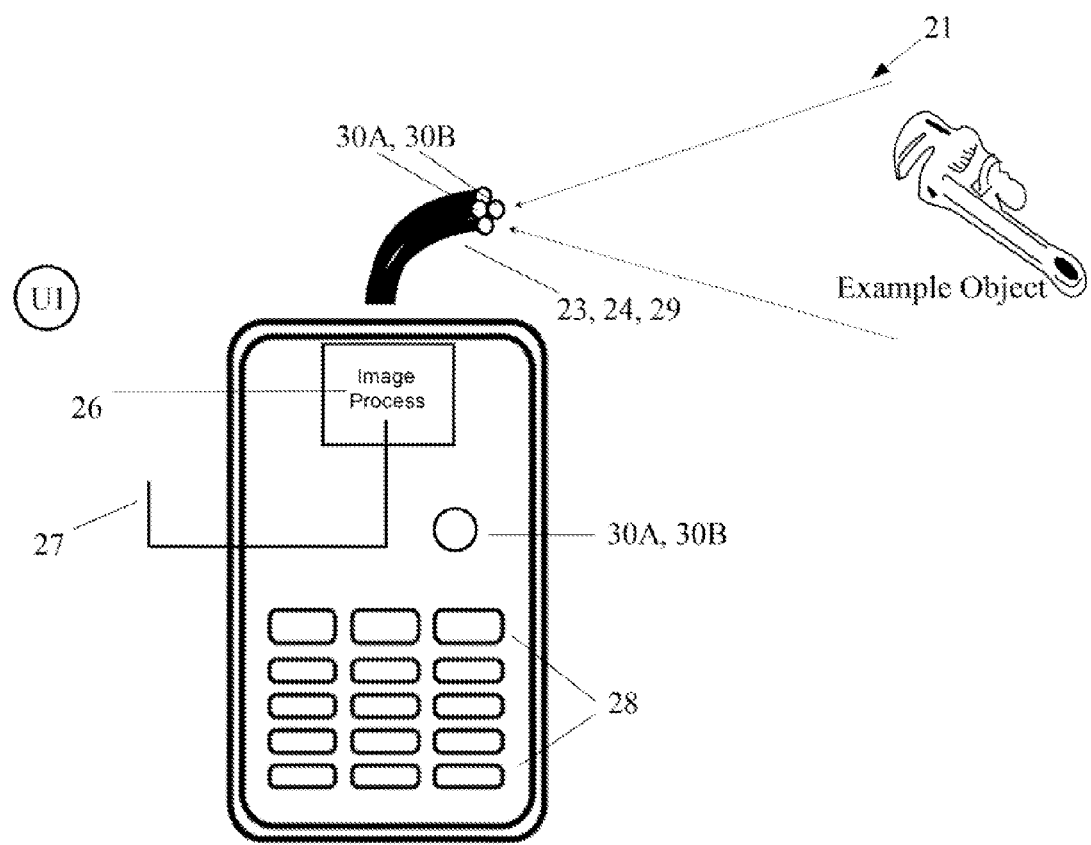
FIG. 2 schematically illustrates a second embodiment of the invention.

FIG. 2 schematically illustrates a second embodiment, wherein a first cellphone 21 has a flexible and rotatable image forming mechanism 23 (e.g., an optical fiber or assembly of fibers 24 with an associated lens 25). The image forming mechanism 23 can be rotated to a first angular position to receive an image of the user U1, or can be rotated to a second angular position to receive an image of a document or other object Obj. The received image is processed by an electronic/optical processing module 26 and is transmitted through a cellphone antenna 27 to a second cellphone 29 that is spaced apart from the first cellphone 21. The first cellphone 21 has a keyboard and audio/voice input mechanism 28 with at least one activatable key thereon on a first surface. After the image of the user U1 or of the object Obj is received by the image processing module 26, the received keyboard signal, audio/voice signal and/or visual signal are processed and transmitted as in the first embodiment.

An optical filter is optionally part of the image processing module 26 and functions in a manner similar to the optional optical filter in the first embodiment. A light source, 30A and/or 30B, is optionally included that functions in a manner similar to the light source 117A and/or 17B in the first embodiment. The light source, 30A and/or 30B, for the second embodiment 21 may be part of an array of optical fibers adjacent to the assembly 23 that direct light toward whatever object or person the image forming mechanism is directed at.

What is claimed is:

1. A cellphone system for image processing using a cellphone, the system comprising:
    a first cellphone having an integrated image forming mechanism and image transmission mechanism and having a lens, located on a first surface of the first cellphone, to receive an optically formed image viewed from a first direction and to transmit a representative of the formed image to at least a second cellphone that is spaced apart from the first cellphone, where the first cellphone has an audio/voice input/output mechanism for receiving and transmitting to the second cellphone an audio or voice input signal and has a keyboard input/output mechanism for receiving and transmitting to the second cellphone a keyboard input signal;
    a rotatable image transport channel, having an image-receiving end with an image-receiving lens thereat, to receive an image, to provide an optically formed image and to transport the optically formed image along the channel, where the image-receiving end is rotatable between a first direction, to receive an image of a user of the first cellphone, and a second direction, distinct from the first direction, to receive an image of a selected object; and
    an image processing mechanism for receiving the optically formed image from the channel and for producing and issuing an electronically/optically processed image that is transmitted from the first cellphone to the second cellphone,
    an antenna, associated with the image processing mechanism, configured to transmit a representation of the received image from the first cellphone to the second cellphone;
    where at least one of the first cellphone user image and the image of the selected object is selectively transmitted from the first cellphone to the second cellphone,
    wherein said image transport channel comprises at least one image-transmitting optical fiber and said image-receiving end of said channel is an end of the optical fiber with said lens configured to receive and focus said image so that at least part of said image is received by and transported along the optical fiber.

2. The system of claim 1, wherein said image transport channel further comprises at least a second optical fiber, having a first end that is oriented in substantially the same direction as said first end of said image-transmitting optical fiber and having a second optical fiber second end; and
    an activatable light source connected to the second end of the second optical fiber, to illuminate said first cellphone user and to illuminate said selected object, when the second end of the second optical fiber is oriented in said first direction and in said second direction, respectively.

3. The system of claim 1, further comprising a light source that is activated when said image transport channel is oriented in said first direction, to illuminate at least one feature of said first cellphone user.

4. The system of claim 1, further comprising a light source that is activated when said image transport channel is oriented in said second direction, to illuminate at least one feature of said selected object.

5. The system of claim 1, wherein, when said image transport channel is oriented in said first direction, said first cellphone user image received by said lens is passed through an optical filter before said user image is transmitted to said second cellphone.

6. The system of claim 1, wherein, when said image transport channel is oriented in said second direction, said selected object image received by said lens is passed through an optical filter before said user image is transmitted to said second cellphone.

7. The system of claim 1, wherein said second cellphone has an integrated image receipt mechanism and an image forming mechanism, to receive and display said transmitted image of said selected object received by said second cellphone.

8. The system of claim 1, wherein said second cellphone has an integrated image receipt mechanism and an image forming mechanism, to receive and display said transmitted image of said first cellphone user received by said second cellphone.

9. The system of claim 1, wherein a plurality of images of at least one of said first cellphone user and said selected object are transmitted from said first cellphone to said second cellphone at a transmission rate of at least 3 images per second.

* * * * *